(No Model.)

S. P. BOZARTH.
FUMIGATOR.

No. 464,419. Patented Dec. 1, 1891.

WITNESSES
H. N. Jenkins
Chas F. Mallard

INVENTOR
Stephen P. Bozarth
per Stoddart & Co.,
Attorneys

United States Patent Office.

STEPHEN P. BOZARTH, OF WIMBERLEY, TEXAS.

FUMIGATOR.

SPECIFICATION forming part of Letters Patent No. 464,419, dated December 1, 1891.

Application filed August 25, 1891. Serial No. 403,695. (No model.)

*To all whom it may concern:*

Be it known that I, STEPHEN P. BOZARTH, a citizen of the United States, residing at Wimberley, in the county of Hays and State of Texas, have invented new and useful Improvements in Fumigators, of which the following is a specification.

My invention relates to an improvement in fumigators; and it consists in certain peculiar features of construction and arrangement of parts, more fully hereinafter described, and definitely pointed out in the claims.

The object of my invention is to provide a fumigator especially adapted for fumigating corn in the crib to destroy insects therein without injuring the corn or danger to the structure in which it is contained. This object I accomplish by the construction illustrated in the accompanying drawings, wherein like letters of reference indicate like parts in both the views, and in which—

Figure 1:
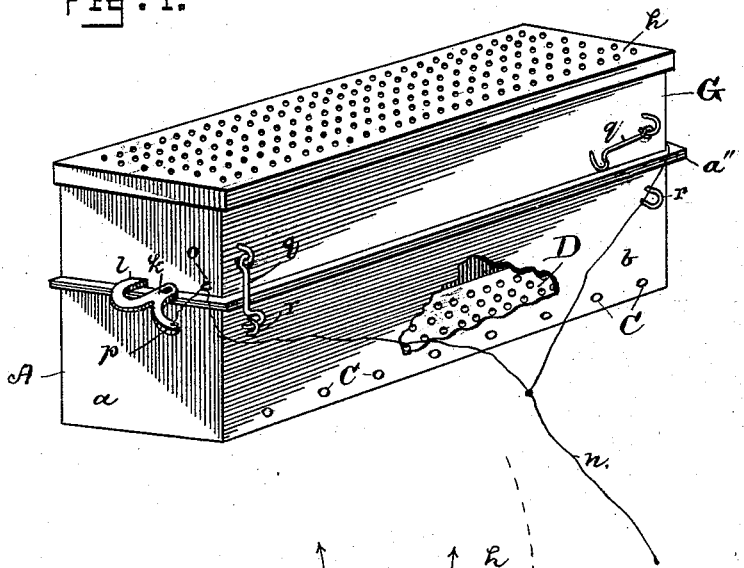
Figure 2:
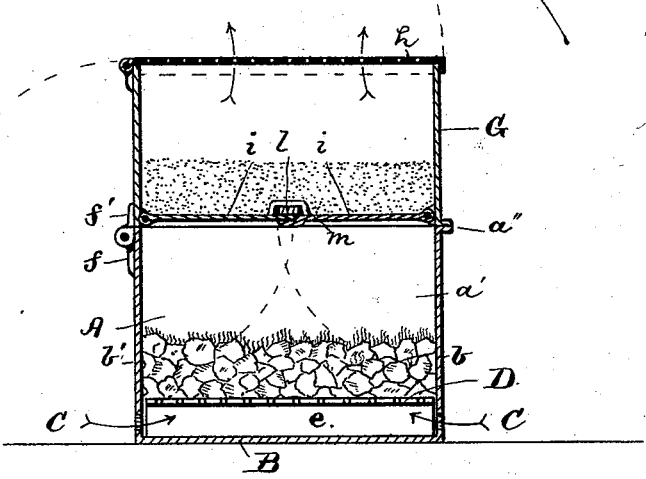

Figure 1 is a perspective view of my improved fumigator, and Fig. 2 a vertical cross-section of same.

In the drawings, the letter A designates the combustion-chamber or fire-box, preferably of a rectangular shape, having a bottom B, ends $a\ a$, and sides $b\ b$. The box A is provided near its bottom with a series of draft-openings C and at its top with outwardly-projecting flanges $a$. In the bottom of the fire-box is a perforated fire-bed or grate D, the ends of which are bent downward to form legs, one of which is shown at $e$ in Fig. 2. The rear end of the fire-box is provided near its top with butts or half-hinges $f$, to which the butts or half-hinges $f$ of a second box or sulphur-chamber G are pivoted.

The sulphur-chamber is provided with perpendicular sides and ends corresponding with those of the fire-box and its top with a hinged sieve or perforated cover, which, while allowing the fumes of the burning sulphur to escape, effectually prevents the outward passage of sparks or fire of any kind. The bottom of the sulphur-box is formed of two plates $z\ z$, which are pivotally connected or hinged to the opposite sides thereof, so as to open downward and drop its contents, when desired, upon the fire below.

A bent lever or trigger $k$ is pivotally connected at each end of the sulphur-chamber, so that the free end of the trigger may operate in a slot and project inwardly under the inner edges of the hinged bottom or through eyes or staples connected therewith, as shown at $m$ in Fig. 2, and thus serve to hold the said bottom in a horizontal position until desired to empty its load, which is effected by means of a wire rope $n$ run through staples $o$ and connected with the outer ends of the triggers, as shown at $p$.

Hooks $q$ and eyes $r$ are connected with the front of the two boxes or chambers to secure the same together, as shown in Fig. 1.

In operating my invention live coals are placed on the grate in the fire-box and the bottom of the sulphur-chamber closed and secured by the triggers. The sulphur-chamber is then shut down over the fire-box and the two securely hooked together. The sulphur or other fumigating material is next placed in the upper box and its sieve or perforated top closed down over same. The apparatus is then moved into position under the crib, and, everything being tight around same, the triggers are pulled and the fumigating material dropped into the fire. The fumes passing into the crib will destroy all animal life therein and serve as a preservative against the return of insects.

Having described my invention, what I claim as new, and desire to secure by Letters Patent, is—

1. A fumigator consisting of a fire-box, a receiving-chamber for the fumigating substance, hinged bottom to the receiving-chamber, and triggers for holding the said bottom in closed position, substantially as and for the purpose set forth.

2. A fumigator consisting of a fire-box, a receiving-chamber for the fumigating substance above the fire-box, a sieve or perforated cover to the receiving-chamber, and a hinged bottom with triggers for supporting same in a horizontal position, substantially as set forth.

3. A fumigator consisting of a fire-box, a chamber for fumigating material hinged thereto, a perforated cover and hinged bottom to the receiving-chamber, and triggers for holding or releasing the hinged bottom, substantially as specified.

4. A fumigator consisting of a fire-box having perforations near the bottom thereof, a grate in the bottom of the fire-box, a receiving-chamber hinged to the fire-box and hooks and eyes for securing the same together, a perforated cover to the receiving-chamber, and the bottom of said chamber composed of two hinged plates and triggers for supporting the inner edges of same, substantially as and for the purpose described.

In testimony whereof I affix my signature in presence of two witnesses.

STEPHEN P. BOZARTH.

Witnesses:
A. Y. OLDHAM,
H. E. BARBER.